United States Patent [19]

Seelman

[11] Patent Number: 4,599,855
[45] Date of Patent: Jul. 15, 1986

[54] CONTROLS FOR THE DRIVE OF A VEHICLE WITH DIFFERENTIAL SPEED STEERING

[75] Inventor: Hans H. Seelman, Aschaffenburg, Fed. Rep. of Germany

[73] Assignee: Linde Aktiengesellschaft, Wiesbaden, Fed. Rep. of Germany

[21] Appl. No.: 482,142

[22] Filed: Apr. 5, 1983

[51] Int. Cl.[4] .................. B62D 11/04; F16D 31/02
[52] U.S. Cl. .................................. 60/421; 60/427; 60/444; 60/484; 60/486; 180/6.48
[58] Field of Search ................ 180/6.48; 60/420, 427, 60/484, 421, 429, 444, 445, 423, 428, 443, 486, 487, 490

[56] References Cited

U.S. PATENT DOCUMENTS

| | | | |
|---|---|---|---|
| 3,672,161 | 6/1972 | Krusche | 60/420 |
| 4,019,321 | 4/1977 | Aoyama et al. | 180/6.48 X |
| 4,076,090 | 2/1978 | Krusche et al. | 180/6.48 |
| 4,324,098 | 4/1982 | Aruga et al. | 60/420 |
| 4,376,371 | 3/1983 | Kojima et al. | 60/420 |
| 4,458,485 | 7/1984 | Seelmann | 60/427 |

Primary Examiner—Edward K. Look
Attorney, Agent, or Firm—Buell, Ziesenheim, Beck & Alstadt

[57] ABSTRACT

A control drive is provided for the drive of a vehicle, whose steering is effected by a differential driving of the drive wheels of the two sides of the vehicle, where the drive wheels of each vehicle side are driven through a hydrostatic drive unit, whose final control element is connected with a servo piston capable of sliding in an operating cylinder and is acted upon from both sides, in which case the servo piston is acted upon from one side for controlling the travel speed and the control pressure determining the travel speed is reduced for effecting a turn on one side of the vehicle for large turning radii, and for smaller turning radii a pressure is additionally built up on the opposite side of the servo piston, the said pressure being derived from the control pressure determining the travel speed on the other side of the vehicle.

8 Claims, 5 Drawing Figures

CONTROLS FOR THE DRIVE OF A VEHICLE WITH DIFFERENTIAL SPEED STEERING

This invention relates to controls for the drive of a vehicle with differential speed steering and more particularly to a control for the drive of a vehicle with differential-speed steering and with a hydrostatic drive unit for driving the drive wheels of each of the two sides of the vehicle Such a control is already proposed in German patent No. 31 09 491 and is generally well perfected and of good design. However, such control still has a shortcoming in that, if it is switched to only a slight travel speed, but the control pressure pickoff is in the extreme out-position for turning, the vehicle can effect a travel movement that an inexperienced operator does not immediately anticipate. It is also quite difficult with this design to achieve an absolute analogy with regard to the nature and mode of actuation of the actuators between the currently widely used vehicles with hydrodynamic drive with turning control by energy dissipation on the inside of the turn and vehicles with a hydrostatic drive unit on each side of the vehicle.

The present invention proposes to further improve the familiar control mechanism and to have the vehicle always definitely effect the travel movements expected even by an inexperienced operator and to have the vehicle equipped with actuators that are analogous in their arrangement and function to those of vehicles with hydrodynamic converters.

This problem is solved in accordance with the invention in that each of the two control pressure pickoffs assigned to a turning direction is connected for pressure supply to the outlet of the control pressure pickoff determining the travel speed and has a pressure reducing valve, which in the nonactuated state allows the control pressure medium to flow through unimpeded and in the actuated state decreases the pressure of the medium as compared with the inflow pressure. It is thus assured that the control pressure determining the turning, with which the side of the servo piston that is not loaded by the control pressure determining the absolute travel speed is loaded, cannot be higher than the control pressure determining the absolute travel speed, since the latter is supplied to the control pressure pickoff determining the turning and this pressure pickoff is designed as a valve that can only reduce the pressure present, but cannot produce a pressure higher than the inflow pressure.

This design facilitates a decrease in the control pressure on the inside of the turn as compared with that on the outside of the turn and only then the building up of a counterpressure on the opposite side of the servo piston. Even with the full actuation of the control pressure pickoff influencing one turning direction a control pressure cannot be built up in one operating cylinder, even if at the same time the vehicle is set at only a low travel speed, that adjusts the drive of the vehicle side on the inside of the turn to a higher travel speed than the drive of the side on the outside of the turn, running in the opposite direction, although it is possible to operate both drives in the opposite direction with the same speed, so that the vehicle turns precisely around its vertical axis (i.e., "on a dime").

This design also facilitates additional advantageous refinements. The two pilot valves cannot only be controlled hydraulically, as disclosed in the preferred embodiment or principal application, but selectively also mechanically, electrically or pneumatically.

It is provided in one advantageous embodiment that each of the two control pressure pickoffs assigned to one turning direction consists of two pressure reducing valves that are separate with regard to flow, but are coupled together with regard to function, i.e., with respect to control. It can thus be achieved that the control pressure is first reduced on the inside of the turn and only then is the counterpressure in front of the servo piston built up.

It is provided in one expedient embodiment of the invention that each of the two pilot valves is designed as a 4-connection/3-position valve, where each connection of the one connection pair is connected with one of the two pressure reducing valves of the assigned control pressure pickoff and each of the other two connections of this pilot valve is connected with a pressure chamber of the operating cylinder of the assigned drive unit The direction of travel is then selected by controlling the two pilot valves.

A further simplification or the possibility of eliminating one control pressure pickoff and thus reducing the construction costs in turn results from this inasmuch as it is provided in a further expedient implementation that only one control pressure line is present for the control pressure determining the travel speed, where the control pressure carried in this control pressure line influences the travel speed in both directions of travel, i.e., for forward and reverse travel, independently of the direction in which the vehicle is travelling, in which case the direction is selected by switching the pilot valves.

As with the control according to the principal patent application, only one arbitrarily actuatable actuator need be provided for controlling both the direction and the speed of travel. This actuator can be, e.g., a foot pedal, which, as in normal motor vehicle control, as is also present in the conventional automobile, controls by adjusting the travel speed, in which case the direction of travel is determined by a shift lever. Above all, it is also possible however to design this actuator as a hand lever which is installed as is still currently conventional in crawler-type loaders with drive through a hydrodynamic converter. In these vehicles known to date it is conventional to provide for steering with two pedals, where the pedal located on the inside of the turn is actuated for braking the drive on that side. Precisely this arrangement of the actuators, i.e., the steering pedals, can also be provided in the design according to the invention, in which case however each pedal is connected with a control pressure pickoff such that in construction and mode of actuation there is a complete analogy for the many operators of the control arrangements conventional to date, in which case however the drive can be controlled quite sensitively up to turning on the spot, without dissipation of energy in friction brakes.

The fact that only one control pressure line need be present for the travel speed also makes it possible to make do with a single control pressure pickoff for the travel speed. On the other hand, it may be advantageous to provide one control pressure pickoff for controlling the forward speed and a second control pressure pickoff for controlling the backward speed, in which case the outlets of these two control pressure pickoffs are connected through a change-over valve that switches as a function of pressure to the control pressure line carrying the control pressure that determines the travel speed. Analogously to the arrangement in the principal patent application, this facilitates reversing the two change-over valves hydraulically, depending on which of the two control pressure pickoffs delivers the control pressure determining the travel speed.

It is provided in an expedient embodiment according to the invention that of the two pressure reducing valves located in a control pressure pickoff that is assigned to one turning direction, one is connected directly to the control pressure line carrying the control pressure that determines the travel speed and tne other is connected through a change-over valve that reverses as a function of the pressure and is located between the two lines leading to a pressure chamber of the operating cylinder, and the pilot valve and the pressure reducing valve of the drive unit assigned to the other side of the vehicle, to this control pressure line carrying the control pressure that determines the travel speed.

In one expedient embodiment the functional coupling of the two pressure reducing valves present in one control pressure pickoff is designed so that during actuation the pressure reducing valve connected directly to the control pressure line carrying the control pressure determining the travel is always actuated first and only then is the other pressure reducing valve connected through the change-over valve and pilot valve to the control mechanism of the other side of the vehicle actuated. Then, as already described, a change-over valve that reverses as a function of pressure is installed between the two lines emerging from one connection pair of a pilot valve and leading to a pressure chamber of the operating cylinder; its outlet is connected with the inlet of the pressure reducing valve of the control pressure pickoff assigned to the drive unit of the other side of the vehicle, which is acutated secondly in the functional sequence of actuation, in which case the other pressure reducing valve of this first-mentioned control pressure pickoff is connected directly to the outlet of the control pressure pickoff determining the travel speed.

In another implementation form, which is closer to the design according to the principal patent application No. P 31 09 491.0 and in which, just as in this principal patent application, two travel speed control pressure pickoffs assigned to one direction of travel are provided, where a control pressure line departs from each of these two control pressure pickoffs and they lead respectively to a pressure chamber of the two operating cylinders, in which case the one control pressure pickoff is connected to one side and the other control pressure pickoff to the other side of each operating cylinder. Also according to this implementation the two connections of a pilot valve that are connected with a pilot valve are connected to these lines leading from a control pressure pickoff to a pressure chamber, and a pressure reducing valve is connected to the one line leading from a pilot valve to a control pressure pickoff assigned to turning. This pressure reducing valve shuts off the line in the nonactuated state and in the actuated state connects the line in a throttled manner with a pressureless drain container. A second pressure reducing valve is also connected to the control pressure line of the other side of the vehicle and it is also closed in the nonactuated state, while in the actuated state it connects this control pressure line of the other side in a throttled manner with the second chamber of the operating cylinder.

In the foregoing description of my invention, I have set out certain objects, purposes and advantages of this invention. Other objects, purposes and advantages of this invention will be apparent from a consideration of the following description and the accompanying drawings in which the components of the circuit diagrams of controls pertaining to the invention up to the operating cylinders or the components deviating from these circuit diagrams are depicted and wherein.

Figure 1:
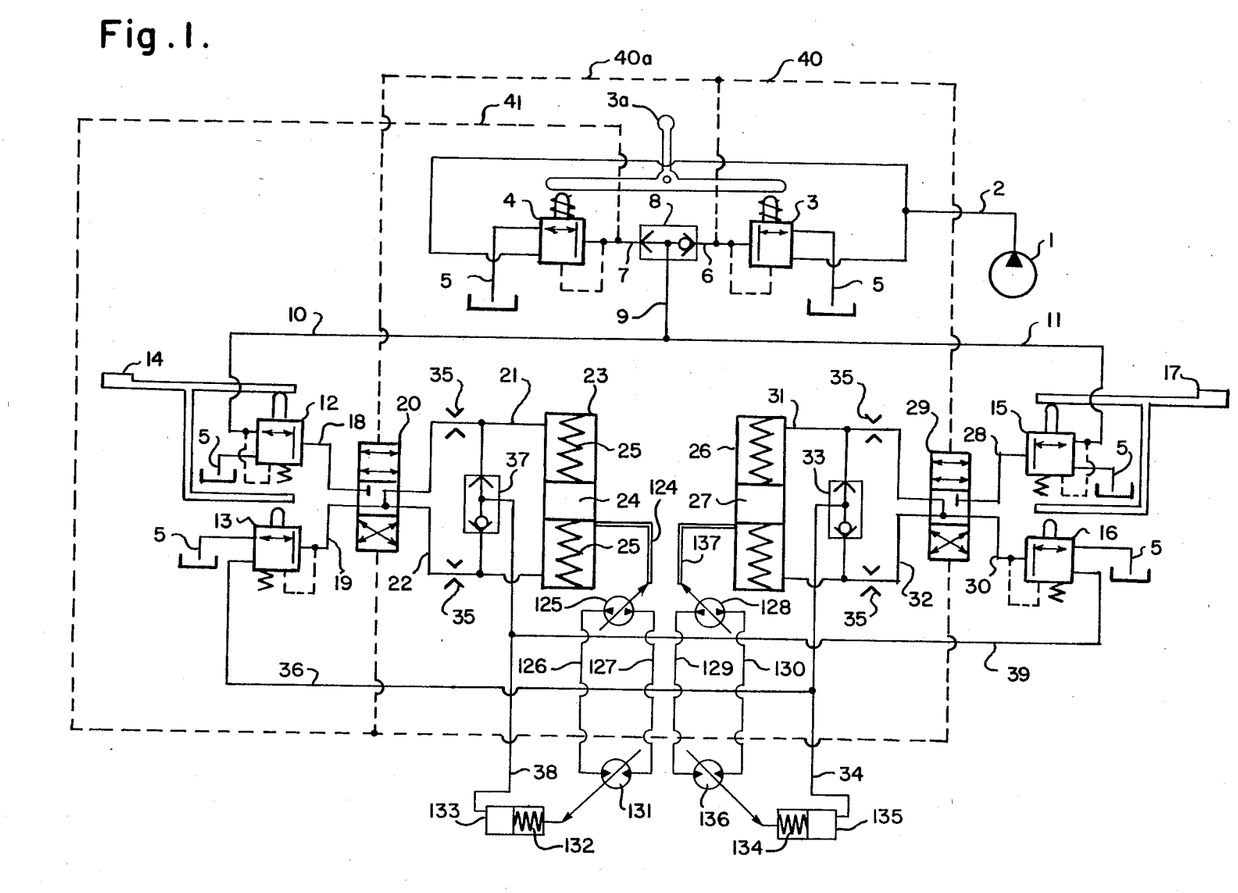
FIG. 1 shows the circuit diagram of an embodiment with two control pressure pickoffs for travel speed and direction and one control pressure line.

A control pressure line 2 departs from a control pressure pump 1 and leads to two control pressure pickoffs 3 and 4. A return line 5 departs from each of these two control pressure pickoffs 3 and 4 and leads to a pressureless container A control pressure line 6 departs from the control pressure pickoff 3 and a control pressure line 7 departs from the control pressure pickoff 4 and the two control pressure lines 6 and 7 lead to a change-over valve 8 that reverses as a function of the pressure. A control pressure line 9 carrying the control pressure that determines the travel speed departs from this change-over valve 8 and branches into two control pressure lines 10 and 11.

The two pressure reducing valves 12 and 13 together form the control pressure pickoff assigned to the left-hand side of the vehicle and are both actuated by the pedal 14, in which case the mechanical coupling is designed so that when the pedal 14 is actuated, the pressure reducing valve 12 is always actuated first up to its maximum value and only then is the pressure reducing valve 13 actuated.

In an analogous manner, the two pressure reducing valves 15 and 16 together form the control pressure pickoff that is assigned to the right-hand side of the vehicle and can be jointly actuated with the aid of a pedal 17, in which case the pressure reducing valve 15 is always actuated first and only then is the pressure reducing valve 16 actuated.

The two lines 18 and 19 leaving one of the two pressure reducing valves 12 and 13 that together form a control pressure pickoff are connected to two connections of the 4-connection/3-position pilot valve 20. Two lines 21 and 22 are connected to the other two connections of this pilot valve 20; one of them is connected to a pressure chamber of the operating cylinder 23 in which the servo piston 24 is capable of sliding and which is connected with the final control element of the left-hand side of the vehicle (not shown either). The servo piston 24 is loaded by two springs 25 in the direction to the neutral position. The servo piston 34 is connected through a lever (or connecting rod) 124 with the final control element of a hydraulic pump 125, which is connected through the lines 126 and 127 with the hydraulic motor 131, whose final control element is in turn connected with the servo piston 132, which is capable of sliding in the operating cylinder 133, which is connected to the line 38.

Analogously, a servo piston 27 i=capable of sliding in the operating cylinder 26 and it is connected with the final control element of the drive unit (not shown) of the right-hand side of the vehicle. The servo piston 27 is connected through a kinematic connection 137 with the final control element of the hydraulic pump 128, which is connected through the lines 129 and 130 in closed circuit with the hydraulic motor 136, whose final control element is connected with the servo piston 134, which in turn is capable of sliding in the operating cylinder 135, which is connected to the line 34. The line 28 departing from the pressure reducing valve 15 leads to a connection of the pilot valve 29, while the line 30 departing from the pressure reducing valve 16 leads to a second connection of the pilot valve 29, in which case two lines 31 and 32 are connected to the second connection pair of this pilot valve 29, each of which is connected to a pressure chamber of the operating cylinder 26. A change-over valve 33 that reverses as a function of pressure is located between the two lines 31 and 32; at its outlet a line 34 is connected and leads to the operating cylinder of a motor (not shown) of the hydrostatic drive unit of the right-hand side of the vehicle. Restrictor 35 that limits a backflow is located between the pilot valve 29 and the connection of the change-over valve 33 in each of the two lines 31 and 32.

A line 36 branches off from this line 34 and leads to the inlet of the pressure reducing valve 13 of the left-hand side of the vehicle.

A change-over valve 37 that reverses as a function of pressure is connected between the two lines 21 and 22 and a control pressure line 38 is connected to its outlet. Line 38 leads to the operating cylinder (not shown) of the hydraulic motor of the drive unit of the left-hand side of the vehicle. A line 39 is connected to this line 38 and leads to the inlet of the pressure reducing valve 16 of the control pressure pickoff assigned to the right-hand side of the vehicle. Analogously as on the right-hand side, a restrictor 35 is incorporated in the lines 21 and 22 between the pilot valve 20 and the connection of the change-over valve 37.

A change-over control pressure line 40 departs from the control pressure line 6 and leads to a change-over control pressure chamber of the pilot valve 29. A change-over control pressure line 40a branches off from the latter and also leads to a change-over control pressure chamber of the pilot valve 20. Analogously, a change-over control pressure line 41 branches off from the control pressure line 7 and leads to the other two change-over control pressure chambers of the two pilot valves 20 and 29.

Either the control pressure pickoff 3 or pickoff 4 can be selectively actuated by means of an arbitrarily actuatable actuator (3a), in which case the vehicle is switched to forward travel when control pressure pickoff 3 is actuated and switches to backward travel when pickoff 4 is actuated, and the degree of actuation determines the travel speed. Turning is controlled such that the right-hand side of the vehicle is the inside of the turn when pedal 17 is actuated, and the turning is controlled such that the left-hand side of the vehicle is the inside of the turn when pedal 14 is actuated, independently of the direction of travel.

The mode of operation is as follows: If control is effected through the said actuator (not shown) of the control pressure pickoff 3, the control pressure line 6 is thus acted upon by pressure, with the result that the change-over valve 8, which reverses as a function of pressure, connects the control pressure line 6 with the control pressure line 9 carrying the control pressure determining the travel speed, such that the control pressure determined by the control pressure pickoff 3 is propagated through the control pressure lines 6, 9, and 10 to the pressure reducing valve 12 and through the lines 6, 9, and 11 to the pressure reducing valve 15. Because neither pressure reducing valve 12 or 15 is acutated, they allow the pressure to pass through unhindered. The control pressure present in the control pressure line 6 is propagated through the reversing pressure line 40 also to the upper reversing pressure chamber of the pilot valve 29 in the drawing and through the reversing pressure line 40a to the upper reversing pressure chamber of the pilot valve 20 in the drawing, with the effect that the pilot valve 29 is manipulated so that it connects the lines 28 with line 31 and lines 30 with line 32 and that the pilot valve 20 connects the line 18 with line 21 and and line 19 with line 22. As a result, the control pressure present in line 9 is conveyed through the pressure reducing valve 12 and lines 18 and 21 into the upper chamber of the operating cylinder 23 in the drawing and on the other hand through the lines 11, 28, and 31 into the upper pressure chamber of the operating cylinder 26 in the drawing. The two servo pistons 24 and 27 are thus acted upon from the same side and control the drive units of both vehicle sides in the same manner for forward travel. The other two pressure chambers of the operating cylinders 23 and 26 are relieved of pressure through the unactuated pressure reducing valves 13 and 16, although the pressure standing in line 31 is present at the inlet at the pressure reducing valve 13 through the reversing valve 33 and the line 35 and the pressure standing in the control pressure line 21 is present at the inlet of the pressure reducing valve 16 through the change-over valve 27, the line 38, and the line 39.

If the pedal 17 is now first actuated somewhat for turning, the pressure reducing valve 15 is thus also actuated and thus reduces the control pressure in lines 28 and 31, so that the upper control pressure chamber of the operating cylinder 26 in the drawing is acted upon by a lower control pressure than the upper control pressure chamber in the operating cylinder 23 in the drawing, with the result that the right-hand drive unit in the drawing is set to a lower output r.p.m. than the left-hand drive unit in the drawing. This continues until the control pressure in the upper pressure chamber of the operating cylinder 26 in the drawing is completely reduced and thus the servo piston 27 and thus the final control element of the drive unit connected with it is brought into the neutral position, such that the right-hand drive unit is switched to a stoppage of the output shaft and thus a track-laying vehicle equipped with this drive turns around the right-hand track. Now if the pedal 17 is further actuated, the pressure reducing valve 16 is also actuated, with the result that it reduces the pressure present in the control pressure line 39 and conveys it through line 30 and line 32 to the lower pressure chamber of the operating cylinder 26 in the drawing.

The servo piston 27 is thus displaced upward in the drawing from the neutral position, with the result that the drive unit of the right-hand side of the vehicle in the drawing is switched to backward travel, i.e., in the opposite direction from the drive unit of the left-hand side of the vehicle in the drawing. If pedal 17 is depressed up to the end position and thus opens the pressure reducing valve 16 to full passage, the same pressure is present in the line 30 and thus in the lower pressure chamber of operating cylinder 26 in the drawing as in line 29 and thus in line 21, with the result that the drive units of both sides of the vehicle operate at the same speed, but in opposite directions. This causes the vehicle to turn around its vertical axis. Since the in-feed pressure at the pressure reducing valve 16 cannot be higher than the pressure in line 21 as a result of the connection of line 39 through the change-over valve 37 to the line 21 even if the control pressure in line 21 is very low, the control pressure in the lower pressure chamber of the operating cylinder 26 in the drawing cannot be greater than the control pressure in the upper pressure chamber of the operating cylinder 23 in the drawing, such that an undesirable travel in the opposite direction can never occur.

Accordingly, the same effect results if pedal 14 is acutated instead of pedal 17.

If the control pressure pickoff 4 is actuated instead of pickoff 3, the control pressure line 7 carries the control pressure, which propagates through line 41 to the lower reversing pressure chambers of the pilot valves 20, 29 in the drawing, so that accordingly the same effect occurs, but only with respect to the other pressure chambers of the operating cylinders 23 anc 26.

Figure 2:
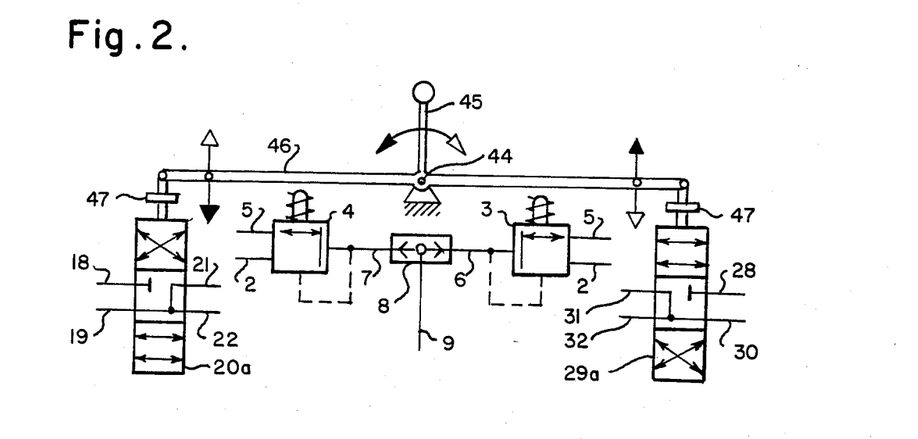
FIG. 2 illustrates an embodiment with two control pressure pickoffs for travel speed and direction and with mechanical connection to the pilot valves.

The actuating lever 45, with which the direction and speed of travel can be arbitrarily regulated, is shown in FIG. 2. In the neutral position of the actuating lever 45 shown in the drawing neither the control pressure pickoff 3 or pickoff 4 are actuated and the pilot valves 20a and 29a are in their neutral position in which they connect the two pressure chambers in the operating cylinder 23 with each other and with the pressure reducing valve 13, and the two pressure chambers in operating cylinder 25 with each other and with the pressure reducing valve 16. If the actuating lever 45 is moved clockwise in the drawing, i.e., in the.direction of the white arrow, the control pressure pickoff 3 is acted upon and the pilot valves 29a and 20a are actuated. The pilot valve 20a differs from pilot valve 20 and the pilot valve 29a differs from pilot valve 29 only in that they are not actuated hydraulically, but mechanically, and pilot valve 20a also differs from pilot valve 20 in that the arrangement of the switching positions is interchanged, since in the arrangement according to FIG. 1 both pilot valves 20 and 29 are actuated in the same direction, while in the design according to FIG. 2 both pilot valves are actuated in the opposite direction due to the mechanical connection.

The actuating lever 45 is supported in a housing-hinged support 44 and rigidly connected with the two-arm lever 46, which is connected with the slides of the two pilot valves 20a and 29a and is arranged so that when the actuating element 45 is moved clockwise, i.e., in the direction of the right-hand arrow, not only are the pilot valves 29a and 20 regulated, but the control pressure pickoff 3 is at the same time actuated to a degree dependent on the extent of lever movement. Elastic bridging elements 47 are provided in the connection rods to the slides of the pilot valves 20a and 29a so that the latter can reach their end position before actuation of the control pressure pickoff 3 begins.

If the actuating lever 45 is actuatec in the counterclockwise direction,i.e., in the direction of the black arrow, the pilot valves 20a and 29a are regulated in the opposite direction and the control pressure pickoff 4 is actuated.

Figure 3:
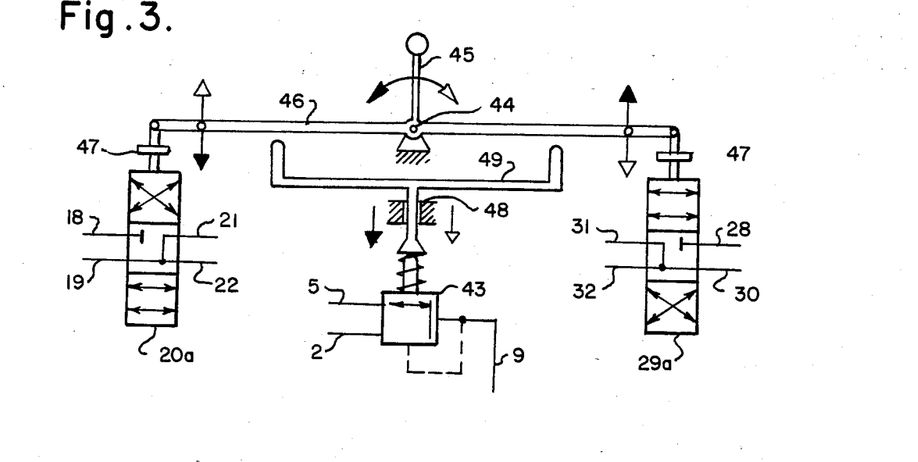
FIG. 3 shows an embodiment with only one control pressure pickoff for the travel speed.

The implementation according to FIG. 3 differs from that according to FIG. 2 in that only one control pressure pickoff 43 is provided instead of the two control pressure pickoffs 3 and 4 assigned to one direction of travel; this pickoff 43 is also connected to the delivery line 2 of the control pressure auxiliary pump 1. Because only this one control pressure pickoff 43 is present, the control pressure lines 6 and 7 and the valve 8, which reverses as a function of pressure, drop out, such that the control pressure pickoff 43 is connected directly to the control pressure line 9, which carries the control pressure that determines the travel speed.

A movement transfer element 49 is supported in a housing-solid longitudinal guideway that permits only a translatory displacement, precisely up and down vertically in FIG. 3. This element 49 has two arms that lie opposite the two-armed lever 46. If the actuating element 45 is moved clockwise, i.e., in the direction of the white arrow, the right-hand arm of the two-arm lever 46 lies against the right-hand arm of the movement transfer element 49 and presses it down to the extent that the actuating lever 45 is moved clockwise. If the actuating lever 45 is moved in the opposite direction, i.e., in the direction of the black arrow, the left-hand arm of the two-arm lever 46 in the FIG. 3 is pressed against the left-hand arm of the movement transfer element 49. In both cases, independently of the direction of movement of the actuating lever 45, the result of moving it is a depressing of the movement transfer element 49, depending on the degree of movement of the actuating lever 45, in which case the control pressure pickoff 43 is actuated by the movement transfer element 49 to a degree corresponding to the movement of the actuating lever 45.

Figure 4:
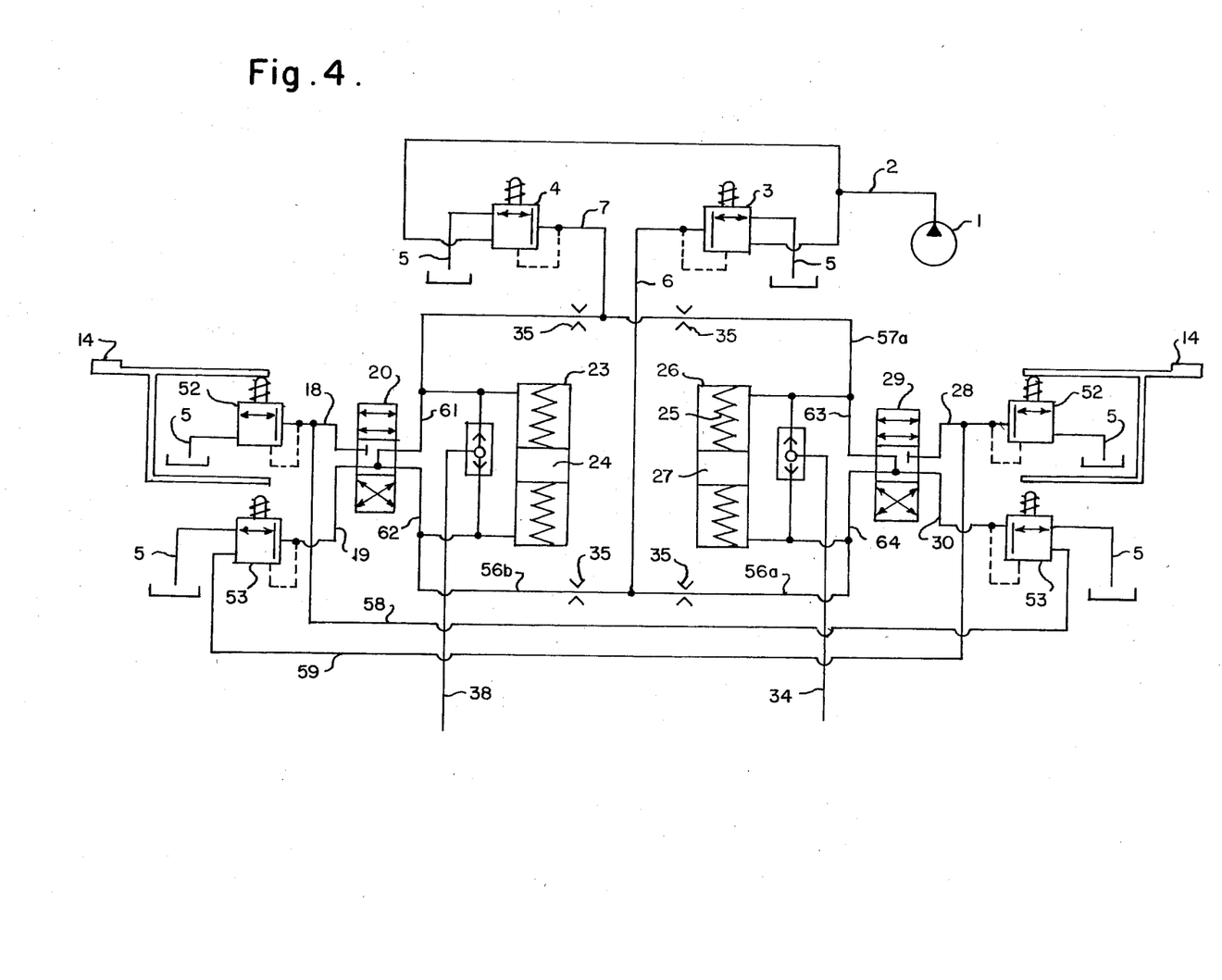
FIG. 4 shows an embodiment with two control pressure pickoffs for travel speed and direction and with two control pressure lines for the travel speed.

Two control pressure pickoffs 3 and 4 are again provided in the implementation according to FIG. 4, where the control pressure line 6 departing from the control pressure pickoff 3 branches into two control pressure lines 56a and 56b, of which line 56b is connected to the lower pressure chamber of the operating cylinder 23 in the drawing and line 56a is connected to the lower pressure chamber of operating cylinder 26 in the drawing. Analogously, the control pressure line 7 departing from the control pressure pickoff 4 branches into two control pressure lines 57a and 57b, of which line 57b is connected to the upper pressure chamber of the operating cylinder 23 in the drawing and line 57a is connected to the upper pressure chamber of operating cylinder 26 in the drawing.

The line 61 joins a connection of the pilot valve 20 with the line 57b and line 62 joins the second connection of this connection pair of the pilot valve 20 with line 56b. Analogously, one connection of the pilot valve 29 is connected through line 63 with line 57a and the second connection of the same connection pair of the pilot valve 29 is connected through line 64 with the line 56a. Of the other two connections of the pilot valve 20 one is connected through line 18 with a pressure reducing valve 52, which in the nonactuated state shuts off line 18 and in the actuated state connects it in a throttled manner with a pressureless tank 5. The second connection of this connection pair of the pilot valve 20 is connected through line 19 with the outlet of a pressure reducing valve 53, whose inlet is connected through line 59 with the line 28. The control pressure pickoff assigned to the left-hand side of the vehicle and capable of being actuated by the pedal 14 thus consists of the two pressure reducing valves 52 and 53.

Figure 5:
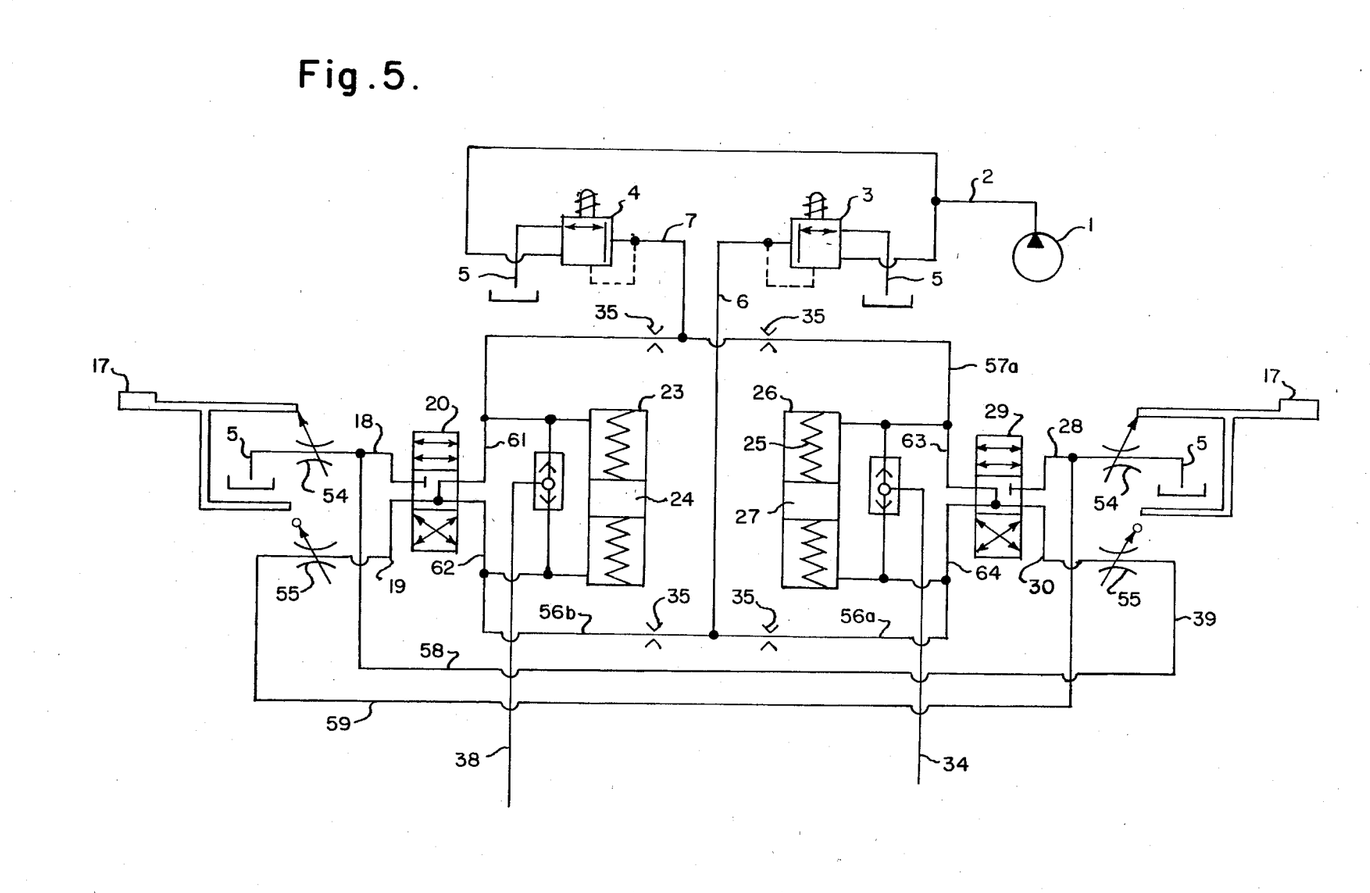
FIG. 5 is an embodiment in exactly the same format as that of FIG. 4 but with a different type of pressure pickoff.

A vehicle is of course normally constructed so that the same control members are located on both sides. In the implementation according to FIG. 4, therefore, the control pressure pickoffs 52, 53 actuatable by the pedal 14 on the left-hand side of the vehicle with other elements are identical to the control pressure pickoffs 52, 53 actuatable by the pedal 17 and assigned to the right-hand side of the vehicle. It is thus possible to design the switching arrangement with one control pressure pickoff 52, 53 on the two vehicle sides, as it is shown in FIG. 4, however, it is also possible to equip a control on both sides with control pressure pickoffs 54 and 55 on the two vehicle sides as illustrated in FIG. 5. In FIG. 5, a restrictor is designated by 54, 55; it shuts off the line completely in the nonactuated state and increasingly opens it in the actuated state. The function of the restrictors 54 and 55 thus corresponds basically to the functions of the pressure reducing valves 52 and 53.

The mode of operation is as follows: If the control pressure pickoff 3 is actuated, the lower pressure chamber of operating cylinders 23 and 26 is acted upon through the lines 6, 56a, and 56b, with the result that the servo pistons 24 and 27 are displaced upward in the drawing to the same degree. At the same time, line 62 is connected with line 18 through the pilot valve 20 and line 64 is connected with line 28 through the pilot valve 29. Now if the steering pedal 14 is actuated, the pressure in line 18 and thus the pressure in line 62 and thus in the lower pressure chamber of the operating cylinder 23 is reduced, in which case the pressure medium is prevented by restrictors 35 from flowing back. If the pedal 14 is further depressed, the pressure reducing valve 53 begins to open and thus conveys pressure medium from line 28 through the line 59 into line 19 and thus into the upper pressure chamber of the operating cylinder 23.

Accordingly, the same effect results in the opposite direction if pedal 17 is actuated or if control pressure pickoff 4 is actuated instead of pickoff 3. The operation of the embodiment of FIG. 5 operates precisely as described above in connection with FIG. 4, except the pickoffs 54 and 55 are restrictors which shut off the lines 18 and 19 and 28 and 30 completely in the non-actuated state and open them increasingly in the actuated state as described above, thus corresponding basically in operation to the pressure reducing valves 52 and 53 of FIG. 4.

The foregoing specification I have set out certain preferred practices and embodiments of this invention, however, the invention may be otherwise embodied within the scope of the following claims.

I claim:

1. In a control for the drive of a vehicle with differential-speed steering and with a hydrostatic drive unit on each side of the vehicle for operating the drive wheels, a final control element at each of the two drive units controlling the operation thereof and each connected with a spring-loaded servo piston capable of sliding in an operating cylinder, the improvements comprising a pressure chamber on each side of the each servo piston in the operating cylinder, means providing an arbitrarily adjustable control pressure on the servo piston, a first pair of control pressure pickoffs for controlling the forward and reverse travel which can be connected with operating cylinders of the drive units of both sides of the vehicle, two additional second pair of control pressure pickoffs, each assigned to one turning direction connected with the operating cylinder of the drive unit of the vehicle side on the inside of the curve, each servo piston being capable of being acted upon by the control pressure pickoff of said first pair of control pressure pickoffs assigned to the control on one side for controlling the direction and speed of travel, and, on the other side, may be acted upon by a control pressure pickoff of the one pair of said second pairs of pickoffs assigned to turning travel for controloing the turning radius, a pilot valve located in the connection line between a control pressure pickoff of said one pair of said second pairs of pickoffs assigned to turning travel and the operating cylinder of the assigned drive unit, an arbitrarily actuable direction and speed selective lever, means for switching said pilot valve as a function of the position of said arbitrarily actuable direction and speed selective lever, said pilot valve connecting the control pressure pickoff assigned to turning travel with a pressure chamber of an operating cylinder of the drive unit on the inside of the curve, the other pressure chamber of which operating cylinder is acted upon by control pressure from the control pressure pickoff of said first pair of pickoffs that determines at least one of the speed and the direction of travel, means for first operating the control pressure pickoff of said one pair of second pairs of pickoffs assigned to one turning direction of the control pressure pickoff pair of said second pairs of pickoffs determining the direction and radius of turning and designed to reduce the control pressure in the chamber of the operating cylinder acted upon by the control pressure pickoff of said first pair of pickoffs that determines the direction and speed of travel in the case of a slight actuation, and then with increased actuation simultaneously operating a control pressure pickoff of said first pair of pickoffs furnishing a control pressure on the ppposite side of the servo piston, and a connection from said control pressure pickoff of said first pair of pickoffs to the pressure supply at the outlet of the control pressure pickoff of said first pair of pickoffs determining the speed of travel.

2. In a control according to claim 1, wherein each pilot valve is designed as a 4-connection/3-position valve, where a pressure reducing valve of one of the control pressure pickoffs assigned to one turning direction is connected to each connection of the one pair of connections of a pilot valve and each of the two other connections of this pilot valve is connected to a pressure chamber of the operating cylinder of the assigned drive unit.

3. A control according to claim 1, wherein each of the control pressure pickoffs of said second pairs of pickoffs assigned to one turning direction consists of two pressure reducing valves that are separate with regard to flow, but are mechanically connected to function together.

4. A control according to claim, 3, wherein the two pressure reducing valves of each control pressure pickoff assigned to one turning direction one is connected directly and the other is connected through a change-over valve located between the two lines each leading to a pressure chamber of the assigned operating cylinder and changing over as a function of the pressure, and pilot valve and pressure reducing valve of the drive unit assigned to the other side of the vehicle, to the control pressure line carrying the control pressure that determines the speed of travel.

5. A control according to claim 2 having two control pressure pickoffs determining the speed of travel, one of which is assigned to one direction of travel, wherein each of these two control pressure pickoffs assigned to one direction of travel is permanently connected with a pressure chamber of the two operating cylinders, each through a control pressure line, in which case the other control pressure pickoff is connected with the other pressure chambers of the two operating cylinders, and the connection of the pilot valve connected with a pressure chamber is connected through a branch line to this line departing from the control pressure pickoff and each control pressure pickoff assigned to one turning direction has two pressure reducing valves which shut off the connected line in the nonactuated state and open it in a throttling manner in the actuated state, in which case in each control pressure pickoff one of these pressure reducing valves connects the line connected with the pilot valve with a pressureless drain, while the pressure reducing valve connected to the other line connected to the pilot valve is conhected on the inlet side through a connecting line to the connecting line of the other side of the vehicle, which connects the pilot valve with the first assigned pressure reducing valve.

6. A control according to claim 2 wherein the pilot valves are controlled hydraulically and each of the two first control pressure pickoffs assigned to control of the travel speed is connected to a change-over control pressure space of each of the pilot valves.

7. A control according to one of claims 1 or 2 or 3 or 4 or 5 or 6, characterized in that the pressure reducing valve connected directly to the control pressure line carrying the control pressure that determines the travel speed is designed as a pressure reducing valve that allows the pressure to pass through unhindered in the nonactuated state, and the other pressure reducing valve connected indirectly to the control pressure line carrying the control pressure determining the travel speed is designed as a pressure-relieving pressure reducing valve in the nonactuated state.

8. A control according to claims 3 or 4, characterized in that the coupling with regard to function of the two pressure reducing valves of a second pair of control pressure pickoff is designed so that in the case of actuation only the pressure reducing valve connected direction to the control pressure line carrying the control pressure determining the travel speed is always actuated first and only after its modulation is the pressure reducing valve connected indirectly to this control pressure line actuated.

* * * * *

UNITED STATES PATENT AND TRADEMARK OFFICE
CERTIFICATE OF CORRECTION

PATENT NO. : 4,599,855
DATED      : July 15, 1986
INVENTOR(S) : HANS H. SEELMAN

It is certified that error appears in the above-identified patent and that said Letters Patent is hereby corrected as shown below:

Column 3, line 12, change "tne" to --the--.

Column 4, line 63, change "34" to --24--.

Column 5, line 3, change "i=" to --is--.

Column 7, line 67, change "direction,i.e.," to --direction, i.e.,--.

Signed and Sealed this

Twenty-fifth Day of November, 1986

Attest:

DONALD J. QUIGG

*Attesting Officer*      *Commissioner of Patents and Trademarks*